United States Patent
Cook

(10) Patent No.: US 11,325,527 B2
(45) Date of Patent: May 10, 2022

(54) HELMET LIGHTING SYSTEM

(71) Applicant: Jeffrey B. Cook, San Diego, CA (US)

(72) Inventor: Jeffrey B. Cook, San Diego, CA (US)

( * ) Notice: Subject to any disclaimer, the term of this patent is extended or adjusted under 35 U.S.C. 154(b) by 585 days.

(21) Appl. No.: 15/860,277

(22) Filed: Jan. 2, 2018

(65) Prior Publication Data

US 2018/0201181 A1 Jul. 19, 2018

Related U.S. Application Data

(60) Provisional application No. 62/445,799, filed on Jan. 13, 2017.

(51) Int. Cl.

| | |
|---|---|
| *B62J 6/015* | (2020.01) |
| *B62J 6/045* | (2020.01) |
| *B62J 6/056* | (2020.01) |
| *B62J 6/165* | (2020.01) |
| *B62K 23/06* | (2006.01) |
| *B62L 3/02* | (2006.01) |
| *B60Q 1/50* | (2006.01) |
| *B60Q 1/46* | (2006.01) |
| *B60Q 1/26* | (2006.01) |
| *A42B 3/04* | (2006.01) |

(52) U.S. Cl.
CPC .......... *B60Q 1/2676* (2013.01); *A42B 3/0453* (2013.01); *B62J 6/015* (2020.02); *B62J 6/045* (2020.02); *B62J 6/056* (2020.02); *B62J 6/165* (2020.02); *B62K 23/06* (2013.01); *B62L 3/02* (2013.01); *B60Q 2900/30* (2013.01)

(58) Field of Classification Search
CPC .................................................. B60Q 1/2676
See application file for complete search history.

(56) References Cited

U.S. PATENT DOCUMENTS

| | | | |
|---|---|---|---|
| 4,891,736 A | 1/1990 | Gouda | |
| 5,426,792 A | 6/1995 | Murasko | |
| 5,720,870 A | 2/1998 | Hahn et al. | |
| 6,406,168 B1 * | 6/2002 | Whiting ............... | A42B 3/0453 362/105 |
| 6,914,520 B2 | 7/2005 | Chung | |
| 6,933,836 B2 | 8/2005 | Hsu | |
| 7,109,857 B2 | 9/2006 | Ross, Jr. et al. | |
| 7,218,214 B2 | 5/2007 | Werner et al. | |
| 7,455,139 B2 | 11/2008 | Lee | |
| 7,556,412 B2 | 7/2009 | Guillermo | |
| 7,667,586 B2 | 2/2010 | Cheng | |
| 7,932,817 B2 | 4/2011 | Chen | |

(Continued)

*Primary Examiner* — Joseph H Feild
*Assistant Examiner* — Pameshanand Mahase
(74) *Attorney, Agent, or Firm* — Kelly & Kelley, LLP

(57) ABSTRACT

A helmet lighting system includes a display attachable to a helmet which is selectively illuminated in response to receiving a wireless signal transmitted from a wireless transmitter operably coupled to a brake or direction signal light of the motorcycle. The display includes flexible base housing attachable to an outer surface of the helmet that at least partially houses an illumination module. A flexible applique overlies the illumination module and is at least partially transparent or translucent so as to pass light from LEDs of the illumination module therethrough. The applique is removably attachable to the base housing and/or the illumination module and may be replaced with other appliques having different logos or indicia.

7 Claims, 7 Drawing Sheets

(56) References Cited

U.S. PATENT DOCUMENTS

| | | | |
|---|---|---|---|
| 7,948,367 B1* | 5/2011 | Arauza | A42B 3/0453 |
| | | | 340/332 |
| 8,009,031 B2 | 8/2011 | Pacheco et al. | |
| 8,083,365 B2 | 12/2011 | Cohen et al. | |
| 8,334,762 B2 | 12/2012 | Szeljack | |
| 8,562,166 B1 | 10/2013 | Kutnyak | |
| 8,789,988 B2 | 7/2014 | Goldwater | |
| 9,457,709 B2 | 10/2016 | Alataas | |
| 9,603,403 B2 | 3/2017 | Boutte | |
| 9,781,958 B2 | 10/2017 | Lau | |
| 2004/0004827 A1* | 1/2004 | Guest | G02B 6/0091 |
| | | | 362/612 |
| 2006/0028349 A1 | 2/2006 | Hsu | |
| 2007/0063831 A1 | 3/2007 | Perkins et al. | |
| 2007/0285221 A1* | 12/2007 | Howe | B60Q 1/2676 |
| | | | 340/479 |
| 2009/0140847 A1* | 6/2009 | Yen | A42B 3/0453 |
| | | | 340/432 |
| 2010/0134272 A1* | 6/2010 | Palacios | A42B 3/0453 |
| | | | 340/475 |
| 2013/0077290 A1* | 3/2013 | HuiHui | A42B 3/0453 |
| | | | 362/106 |
| 2015/0158417 A1 | 6/2015 | Levi | |
| 2015/0173666 A1* | 6/2015 | Smith | A61B 5/11 |
| | | | 600/301 |
| 2017/0029056 A1 | 2/2017 | Applegate | |

* cited by examiner

HELMET LIGHTING SYSTEM

RELATED APPLICATIONS

This application claims the benefit of U.S. Provisional Application No. 62/445,799, filed on Jan. 13, 2017.

FIELD OF THE INVENTION

The present invention relates generally to vehicle safety systems. More particularly, the present invention relates to a helmet lighting system which illuminates as a warning to those behind a motorcycle as the motorcycle slows down or changes directions.

BACKGROUND OF THE INVENTION

It has long been required for motor vehicles to be equipped with illuminated brake and turn signals operable to warn other drivers on the road about a driver's intentions. Additionally, in motor vehicles, the use of center high mounted stop lights (CHMSL) has become pervasive. CHMSLs are characterized by stop lamps positioned at driver eye level and placed in or near the rear window of the motor vehicle. It is now well recognized that positioning stop lamps at eye level and directly in the field of view on the driver of a tailing vehicle results in a reduction in accidents.

Motorcycles are typically characterized by two wheel vehicles that are also equipped with illuminated brake and turn signals to warn other drivers on the road about the motorcycle driver's intentions. However, motorcycles offer little crash protection to the operator and due to their size and narrow width when viewed from the rear, motorcycles are known for escaping notice by inattentive or multitasking automotive and truck drivers on roads and highways. A typical motorcycle frame construction does not offer the option of mounting a stoplight and turn signal at eye level on the frame of the motorcycle.

Rear end vehicle collisions are currently the most common vehicle collisions in the United States with well over two and a half million reported each year. In a rear end collision, the energy from the trailing vehicle is transferred to the front vehicle, propelling it forward. When the front vehicle is a motorcycle and the rear vehicle is a relatively massive automobile or truck, the results are obviously tragic. In such an instance, at the minimum, a motorcycle rider may be dislodged from the motorcycle, which leaves the rider's body momentarily suspended in the air and unprotected against an oncoming vehicle and the eventual abrasion of the pavement below.

Accordingly, it would be desirable to provide a convenient system for illuminating at least a portion of a motorcycle helmet, particularly as brake lights or turn signals are actuated. Although there have been many attempts to provide such helmet lighting systems in the past, many tend to be unduly bulky, expensive to install and use, and thus have not yet found widespread acceptance.

Moreover, many motorcycle riders delight in adding various forms of decorations to their vehicles and/or riding attire including helmets. It would be highly desirable to be able to incorporate such decorative elements into safety features discussed above in an economical and easy to use system. Such would tend to encourage more widespread use of such safety lighting systems by motorcycle riders.

The present invention fulfills these needs and provides other related advantages.

SUMMARY OF THE INVENTION

The present invention is directed to a helmet lighting system in which a display that is attached to a helmet, typically a rear portion of the helmet, is selectively illuminated in response to the motorcycle operator's application of the brakes or direction signal lights. As such, the helmet lighting system of the present invention mounts a stoplight and/or turn signal at eye level of drivers behind the motorcyclist.

The helmet lighting system of the present invention generally comprises a wireless transmitter operably coupled to a brake or direction signal lights of a motorcycle for transmitting a wireless signal when the brake or direction signal is actuated. A display is attachable to a helmet and configured to illuminate upon receiving the wireless signal from the transmitter.

The display comprises a base housing attachable to an outer surface of the helmet. The base housing is flexible so as to conform to the outer surface of the helmet.

An illumination module is at least partially disposed within the base housing. The illumination module comprises a power source, illuminating LEDs, a wireless signal receiver and electronic components for illuminating the LEDs in response to a transmitted wireless signal. The illumination module is preferably flexible.

A flexible applique overlies the illumination module. The applique is at least partially transparent or translucent so as to pass light from the LEDs therethrough. The at least partially transparent or translucent portion of the applique may define a logo and/or word indicia viewable from behind the helmet. The applique is removably attachable to the base housing and/or the illumination module. The system may include a second applique having a second logo and/or indicia. The second applique may be removably attachable to the base housing and/or the illumination module in place of the first applique.

Typically, a periphery of the illumination module is disposed within the base housing and the applique is removably adhered to an exposed portion of an outermost layer of the illumination module. The illumination module may emit a first light color and/or intensity through the applique during normal operation, and emit another light color and/or intensity upon transmission of the wireless signal. For instance, the illumination module emits a red light through the applique when the brake of the motorcycle is actuated.

The system includes a charger for charging a rechargeable battery power source of the illumination module. The charger is configured to be removably attachable to the display so as to overlay the display. The charger may wirelessly charge the rechargeable battery power source of the illumination module. The charger may have an outer configuration substantially matching that of the display, and include at least a portion that is transparent or translucent defining a logo and/or indicia that is illuminated as the charger recharges the display.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the accompanying drawings for purposes of illustration, the present invention is directed to a helmet lighting system, generally referred to by the reference number 10. The helmet lighting system 10 provides a convenient system for warning drivers behind a motorcyclist that the motorcyclist is slowing down or changing directions by illuminating at least a portion of a motorcycle helmet. Moreover, the present invention provides decorative elements, as well as the aforementioned safety features, in an economical and easy-to-use system.

Figure 1:
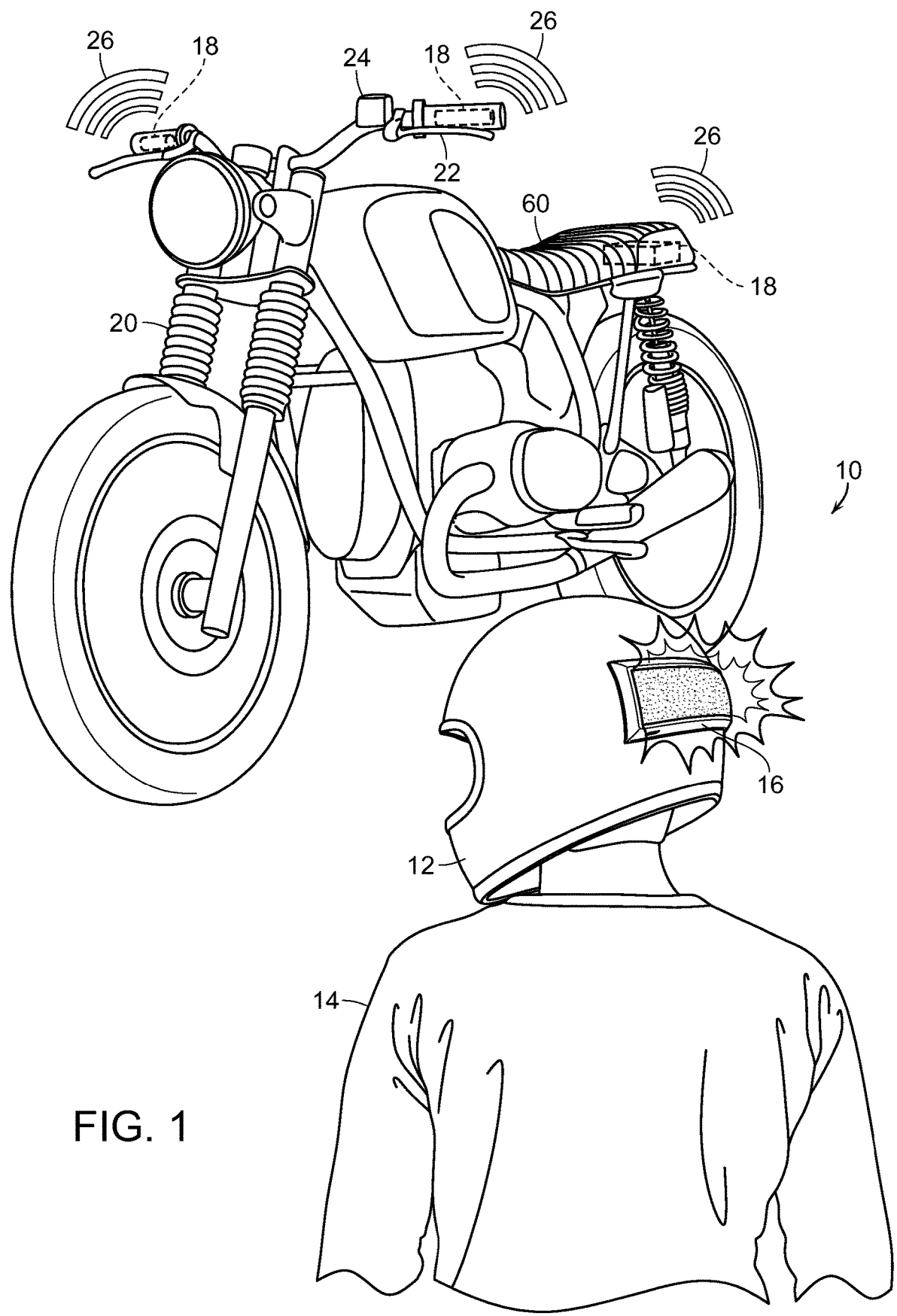
FIG. 1 is a perspective view of a motorcycle and a helmet on a motorcycle rider incorporating the helmet lighting system of the present invention.

With reference now to FIG. 1, the helmet lighting system 10 of the present invention is generally illustrated. A helmet 12 worn by a motorcyclist 14 has a display 16 attached thereto. Typically, as illustrated, the display 16 is placed on a rear portion of the helmet 12 so that those behind the motorcyclist 14, and to a lesser extent those to the side of the motorcyclist, can view the display 16. The display 16, as will be more fully described herein, is configured to illuminate, or change light intensity or color, upon receiving a wireless signal from a wireless transmitter 18 placed in or on a motorcycle 20. The wireless transmitter 18, which may comprise a single wireless transmitter or multiple wireless transmitters, is operably coupled to a brake 22 or turn direction signal 24 of the motorcycle 20, such that as the brake 22 and/or turn direction signal light 24 is actuated, the wireless transmitter transmits a wireless signal 26, such as a Bluetooth or radiofrequency signal, which is received by display 16.

Figure 2:
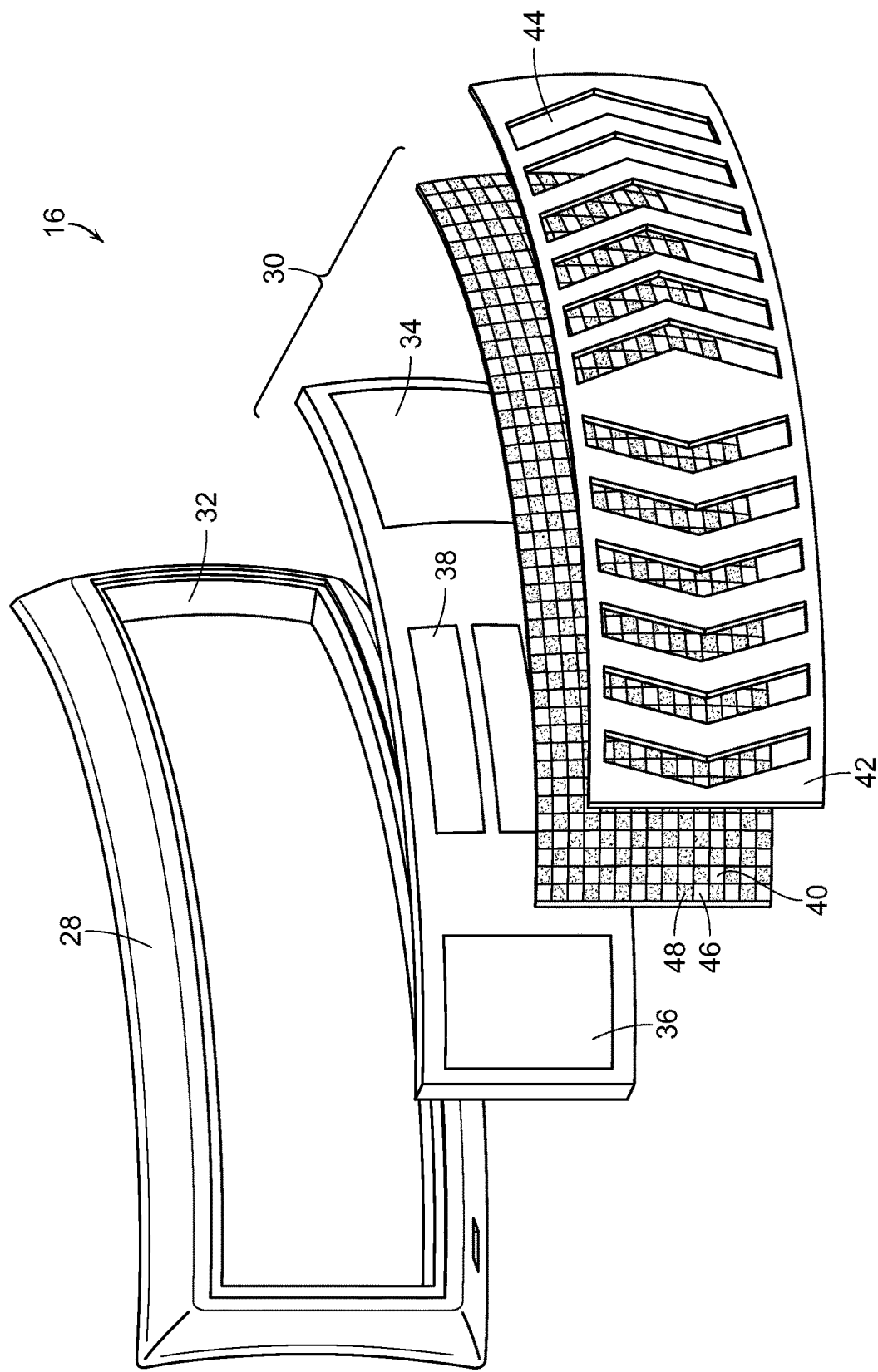
FIG. 2 is an exploded perspective view of a display attachable to a helmet, in accordance with the present invention.

With reference now to FIG. 2, an exploded perspective view of a display 16 embodying the present invention is shown. The display 16 comprises a base housing 28 having a back surface thereof attachable to the helmet 12. This can be, typically, by means of an adhesive. The base housing 28 is comprised of a flexible material, such as a rubber or polyurethane material or the like. The base 28 is preferably flexible in nature so as to conform to an outer surface of the helmet 12 to which it is attached. As the display 16 is typically attached to preexisting helmets, it is desirable that the display 16 be flexible and capable of conforming to different styles and configurations of helmets. An illumination module 30 is at least partially disposed within the base housing 28. For example, as illustrated, a periphery of the illumination module 30 is disposed within an inner track 32 formed on an inner peripheral surface of the base housing 28 so as to reside therein while an outer layer or surface of the illumination module 30 remains exposed when inserted into the base housing 28.

With continuing reference to FIG. 2, the illumination module 30 is comprised of a power source 34, a wireless signal receiver 36 and electronic components 38 for illuminating LEDs 40 in response to receiving a transmitted wireless signal 26 from the wireless transmitter 18. The power source 34 is typically a rechargeable battery, such as a rechargeable lithium ion battery or the like. Preferably, the illumination module is also flexible, such as being encapsulated in polyurethane rubber or the like, so as to fit within the base housing 28 and also conform to the outer surface of the helmet 12.

Figure 3:
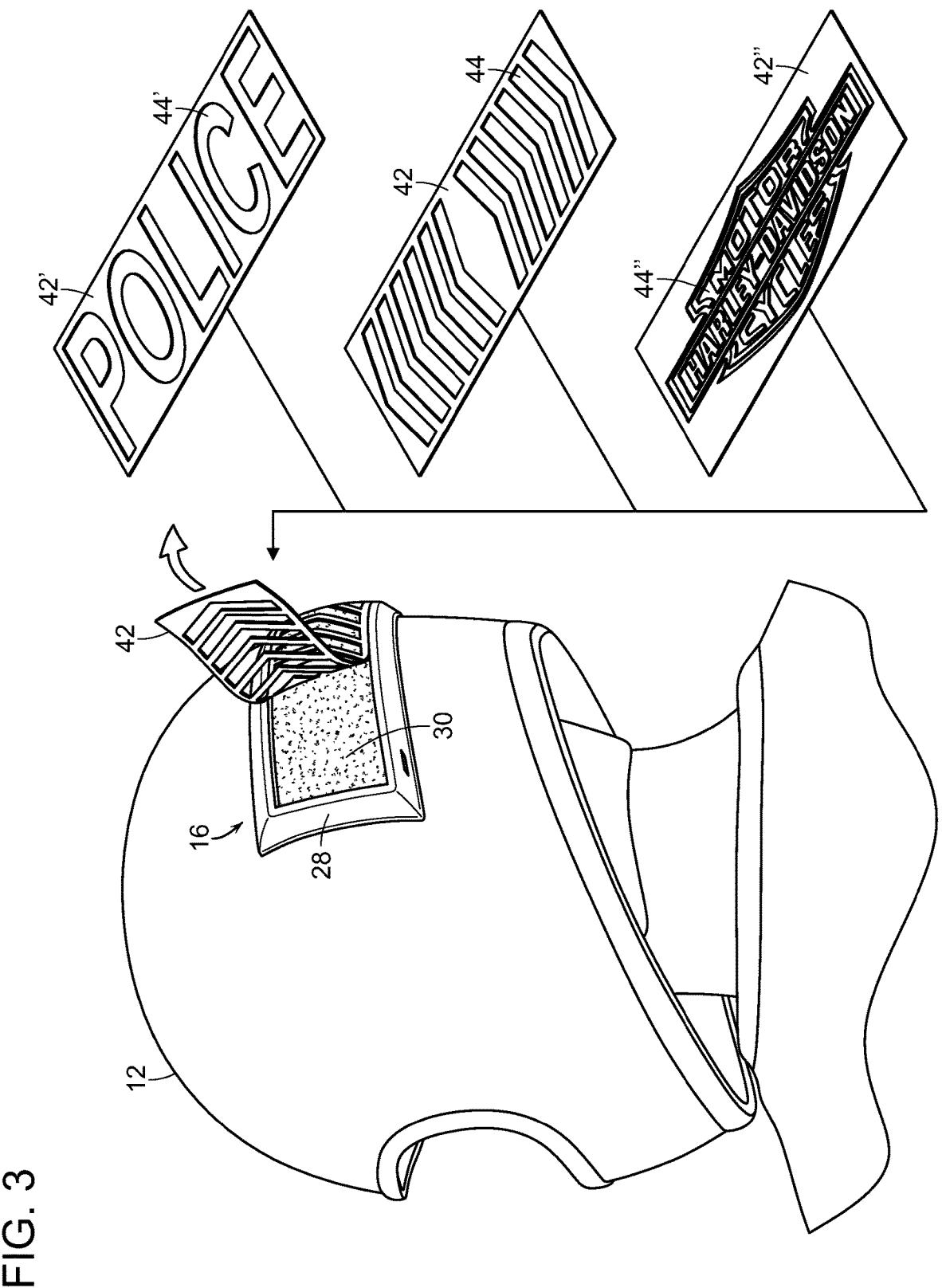
FIG. 3 is a rear perspective view of a helmet having the display attached thereto, and illustrating the removal and replacement of an applique to the display, in accordance with the present invention.

With reference now to FIGS. 2 and 3, a flexible applique 42 is removably attachable to the illumination module 30 and/or the base housing 28. The applique 46 may be comprised of a flexible material, such as polyurethane, so as to overly the illumination module 30 and generally conform to the illumination module 30 and/or base housing 28, which when attached to the helmet 12 generally conform to the outer surface and configuration thereof. Typically, the applique 42 is removably attached to an outer exposed surface of the illumination module 30, such as the LED layer 40 of the illumination module 30.

The applique 42 has portions 44 which allow light to pass therethrough, such as being at least partially transparent or translucent so as to pass light from the LEDs therethrough. In preferred embodiments of the invention, the at least partially transparent or translucent portions 44 of the applique define a word, indicia, and/or a logo, such as that shown in FIG. 3, which are viewable from behind the helmet 12. For example, as illustrated in FIG. 2, the portions 44 which allow light to pass therethrough may be formed as directional arrows. When the motorcycle brake is actuated, light may pass through all of the directional arrow portions 44. However, when a direction turn signal of the motorcycle is actuated, the LEDs may only illuminate selected portions 44, either simultaneously or in sequence, to indicate to those travelling behind the motorcyclist that the motorcyclist is turning left or right, for example. However, as seen in FIG. 3, the portions 44' may form letter indicia forming a word, such as "police", but could also include other words such as "stop", etc. As further illustrated in FIG. 3, the light transmitting portions of the applique could be in the form of logos and/or other indicia, such as the "Harley-Davidson Motorcycles" logo 44" of applique 42", or any other desired logo or the like. In this manner, the display 16 may serve not only as a warning system but also as a decorative feature of the motorcyclist's helmet. It can be seen from FIG. 3 that an applique 42 may be peeled off, due to its removable connection to the illumination module 30 and/or base housing 28, such as by using removable adhesive such as 3M polyurethane rubber adhesive or the like, and replaced with another applique 42', 42", etc. In this manner, the helmet 12, and more particularly the display 16 may be customized by the motorcyclist.

With reference back to FIG. 2, as mentioned above, the illumination module 30 includes LEDs which are selectively illuminated. These LEDs may be COB (Chips on Board) or the like. The LEDs 40 may only be illuminated when a wireless signal is received by the illumination module, such that the display 16 is only illuminated when the brake and/or direction signal lever or switch of the motorcycle is actuated. However, preferably, at least a portion of the LEDs 40 are constantly illuminated when the system is in use so that those behind the motorcyclist can view the logo and/or indicia of the applique of the display 16. When the brake 22 or turn direction signal 24 of the motorcycle 20 is actuated, resulting in a wireless signal 26 being transmitted from the wireless transmitter 18, additional or other LEDs are illuminated so that a greater intensity of light is emitted from the display 16 or a different color of light is emitted from the display 16. For example, the applique 42 may be illuminated by LEDs 40 of a first color, graphically illustrated by the white blocks 46 in FIG. 2, which may be, for example, white, blue, etc. When the brake 22 of the motorcycle 20 is actuated, resulting in the generation of a wireless signal 26, a second color, graphically represented in FIG. 2 by the shaded areas 48, may be illuminated, which could be a red color, for example. Thus, when the motorcyclist applies the brake, the display 16 changes from the first color, such as white or blue, to a second color, such as red, to alert those traveling behind the motorcyclist that he or she is slowing down or stopping. The first or second color LEDs 46 or 48 could be utilized to indicate when the turn direction signal 24 of the motorcycle 20 is actuated, and that a left portion of the applique 42 is illuminated in a greater intensity or a different color, or a flashing or pulsating illumination of light or different color, or even a sequential illumination, such as from center to left of the applique. It will also be understood that a third color, or more, could be utilized. The LEDs 46 and 48 may be of a different color, or multi-color LEDs may be utilized. Moreover, while the preferred embodiment utilizes LEDs it will be appreciated that other sources of illumination could be utilized instead. It will be appreciated that the electronic components 38 of the illumination module 30 will include those components, such as a microcontroller or microprocessor, to control the illumination of the LEDs on a normally operating basis as well as when the wireless signal 26 is received.

Figure 4:
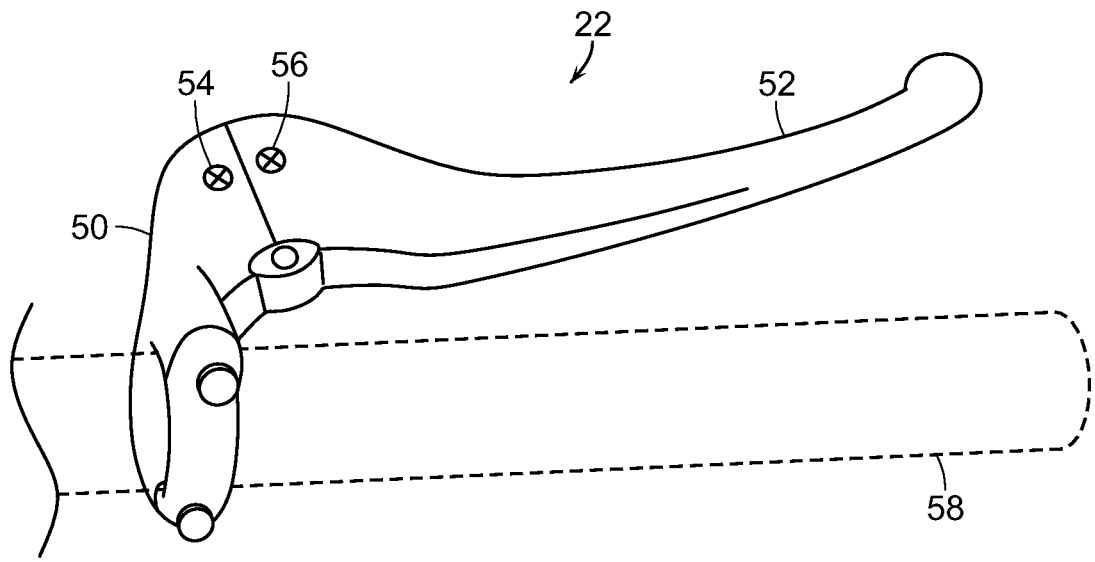
FIG. 4 is a diagrammatic view of a brake lever of a motorcycle in a non-braking position.
Figure 5:
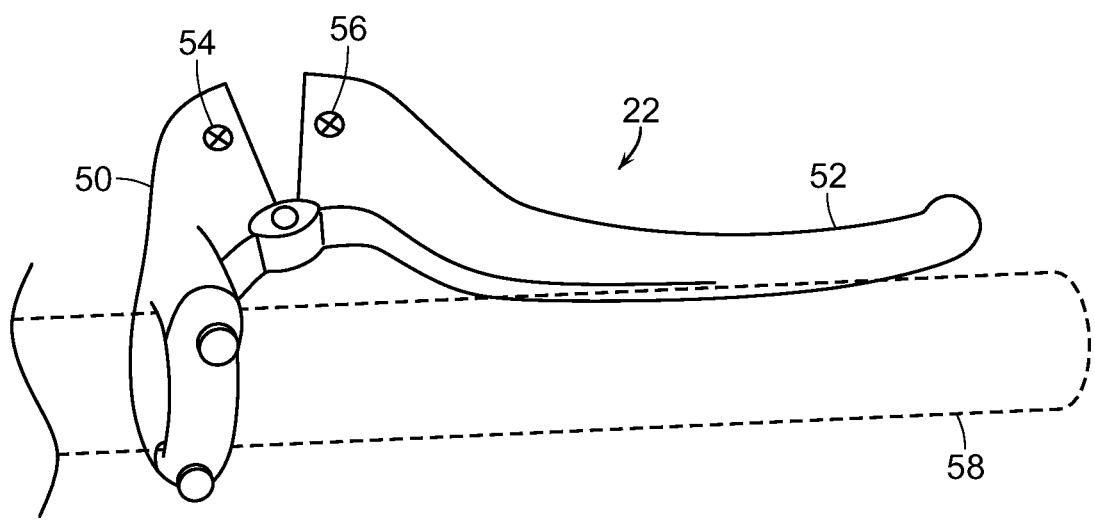
FIG. 5 is a perspective and diagrammatic view similar to FIG. 4, illustrating actuation of the brake lever and sensors associated with the wireless transmitter, in accordance with the present invention.

With reference now to FIGS. 4 and 5, the wireless transmitter 18 can be operably coupled to the brake 22 and/or directional turn signals 24 of the motorcycle 20 in a variety of ways. For example, a brake assembly 22 is illustrated in FIGS. 4 and 5 having a base component 50 and a lever component 52. Sensors 54 and 56 are associated with the base component 50 and the lever 52. When the brake is not being applied, as illustrated in FIG. 4, the sensors 54 and 56 are in a first position. However, when the brake is applied, such as by depressing the lever 52 towards the handle 58 of the motorcycle, at least one of the sensors 54 and 56 is moved into a second position, thus actuating the sensors such that the wireless transmitter 18 generates a wireless signal 26. This will, as described above, cause the display 16 to be illuminated, such as with a red light emanating from the LEDs 40. A similar arrangement can be used with the foot pedal brake of the motorcycle and turn direction signals. However, other means of detecting the braking and/or activation of a turn signal of the motorcycle 20 can be utilized such as coupling a sensor to the brake light and/or turn lights of the motorcycle 20, the wiring extending between the brake and/or a turn signal switch to the respective light, or the like. The sensor may detect electricity or current being applied to the electric cable, light module, bulb socket, or the like so as to sense that the brake and/or turn directional signal has been actuated. The wireless transmitter may be disposed in a convenient location on or in the motorcycle 20, such as within the handle 58, under the seat 60 or any other desirable location.

It is also contemplated by the present invention that a speed or motion sensor, such as an accelerometer or a gyro or the like be disposed within the display 16, motorcycle 20, or even the helmet 12 which could sense when the motorcycle is decelerating or moving left or right. This may be in addition to, or used instead of, the sensors mentioned above. In those instances, the display 16 will be illuminated, either by a different light intensity and/or color to indicate such deceleration or left or right movement. This can be, as described above, by utilizing a different intensity of light, a different color of light, such as red for stopping or amber for turning or the like.

Figure 6:
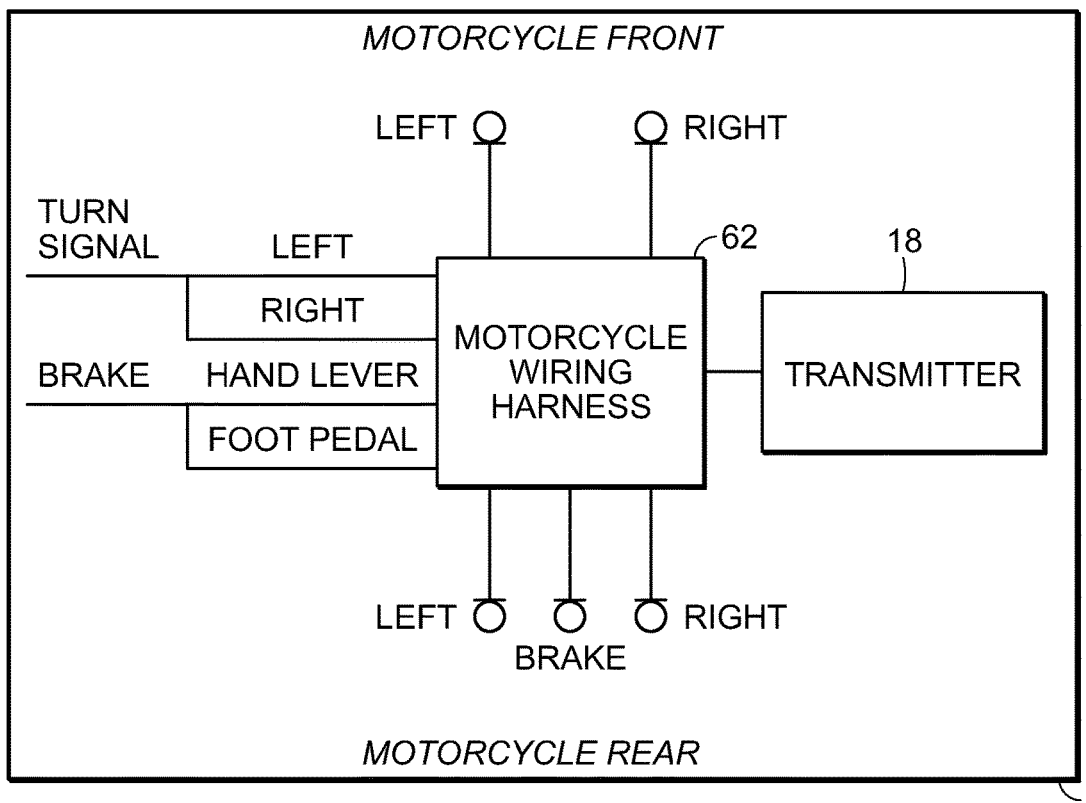
FIG. 6 is a block diagram illustrating how a wireless signal may be generated by actuation of a brake or direction signal of the motorcycle.

With reference now to FIG. 6, the wireless transmitter 18 is operably connected to the hand lever and/or foot pedal brake as well as the left or right turn directional signal. This may be via the motorcycle wiring harness 62, or other aspect of the electrical system of the motorcycle, such as the left or right turn signal lights or wiring or brake light or wiring, as illustrated in box 64. The designations of "left" and "right" at the top of the box 64 represent the left and right turn signal lights at the front of the motorcycle. Similarly, the "left" and "right" designations at the bottom of box 64 represent the left and right turn signal lights at the rear of the motorcycle. The brake light is also diagrammatically illustrated at the rear of the motorcycle in FIG. 6.

Figure 7:
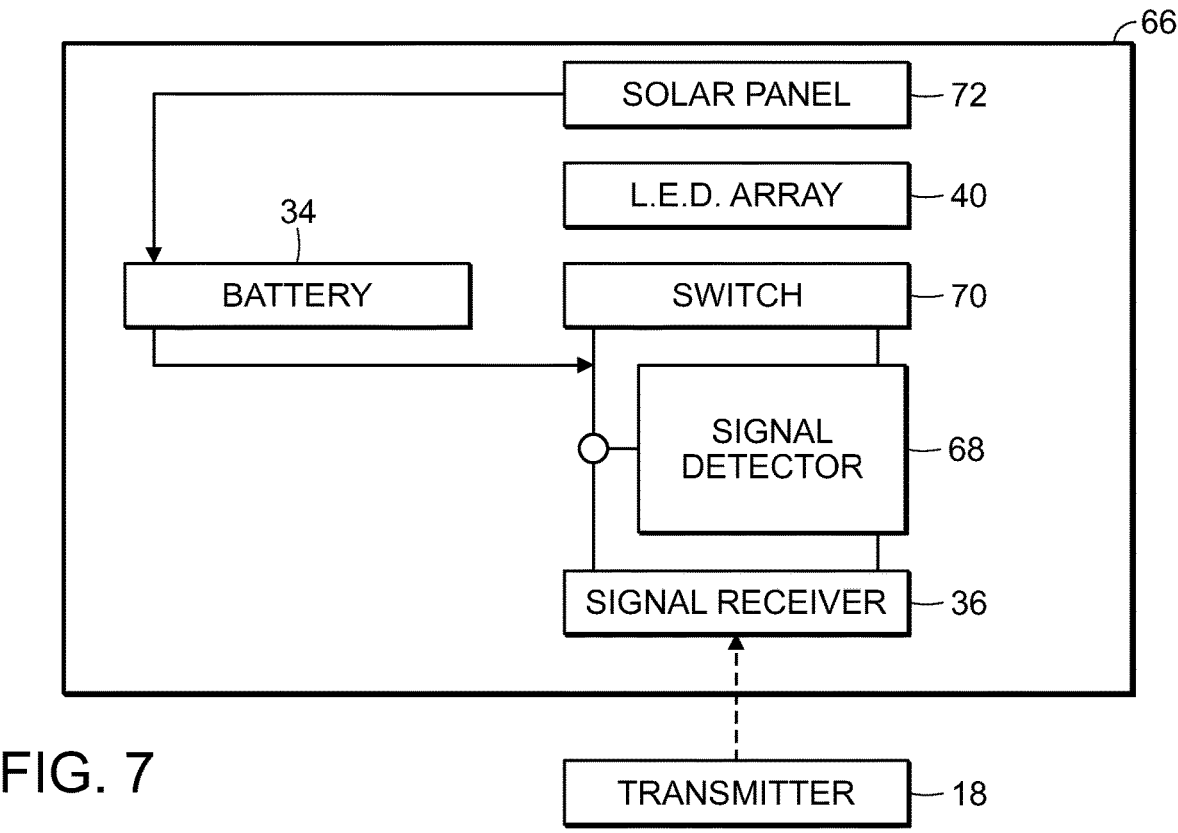
FIG. 7 is a block diagram illustrating the receipt of a wireless signal from the transmitter by the display so as to illuminate the display, in accordance with the present invention.

With reference to FIG. 7, when the wireless transmitter 18 generates and transmits a wireless signal 26, various components of the display 16, as illustrated in box 66 may be activated. The signal receiver 36 receives the wireless signal, which may comprise a Bluetooth or radiofrequency signal or the like. A signal detector 68 may activate a switch 70 which provides power from the power source, typically a rechargeable battery 34, to the LED array 40. As described above, in a particularly preferred embodiment, the LED array 40 is at least partially illuminated or illuminated with a first color during normal operation, but is illuminated with a higher intensity or a different color when a wireless signal indicating that a brake or turn direction signal of the motorcycle 20 has been actuated. The transmitter 18 may generate a different wireless signal, depending upon whether the brake is actuated, a left turn direction signal is activated, or a right turn signal is activated so that the electronic components 38 of the illumination module 30 may properly illuminate the LED array, such as illuminating red LEDs when the brake is actuated, amber LEDs when the turn signals are actuated and the like.

The power source 34 of the display 16 is typically a battery. The battery may be replaced as needed. More typically, however, the battery 34 is rechargeable. This may be by a variety of means, including a solar panel 72 which is attachable to, for example, a top surface of the helmet 12. During the daylight hours, the solar panel 72 could charge the battery 34, which would then supply power to the display 16 during operation of the display 16 and system 10 during the day and/or night.

Figure 8:
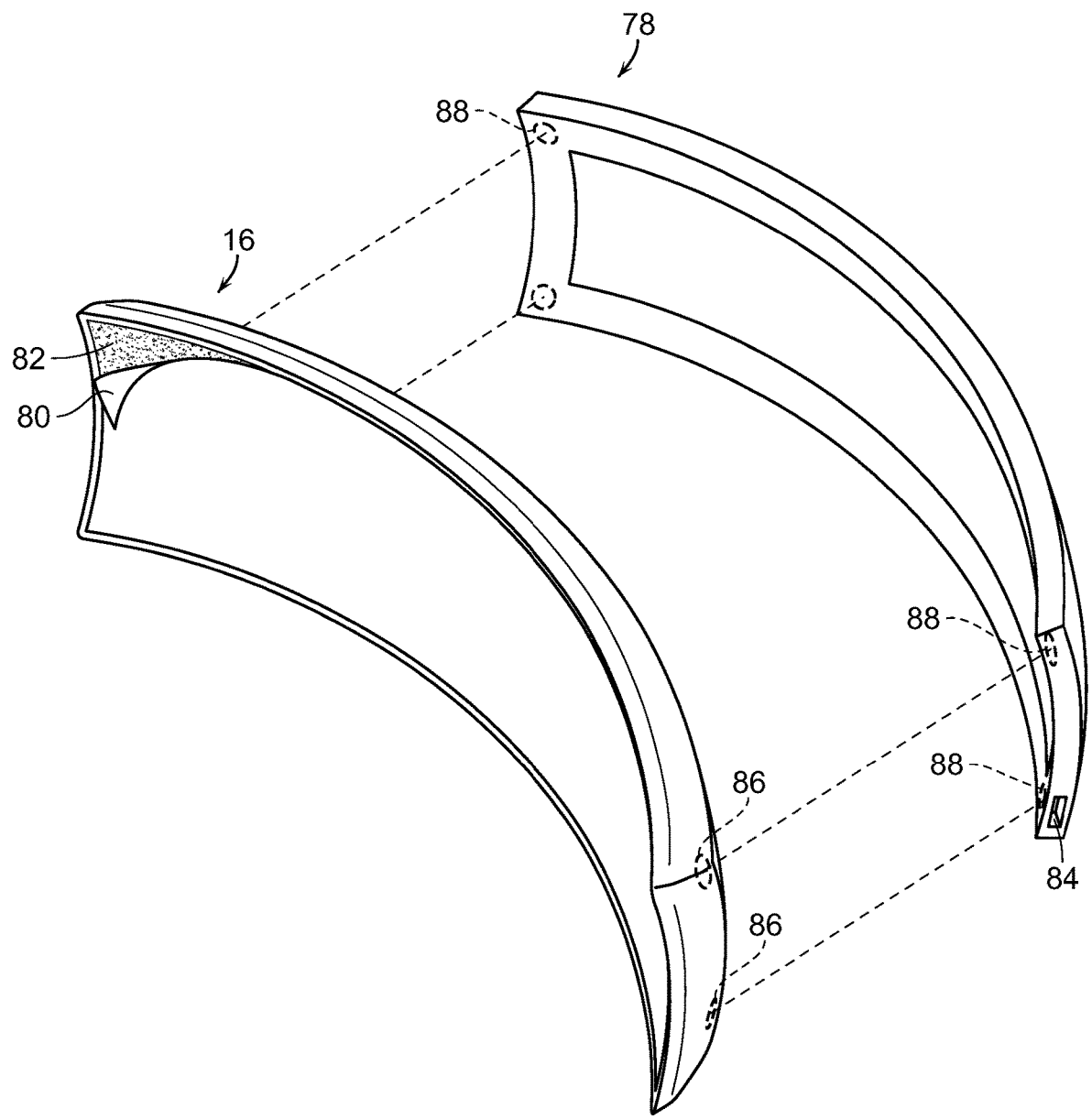
FIG. 8 is a rear perspective and exploded view illustrating the display of the present invention and a charger removably attached thereto.
Figure 9:
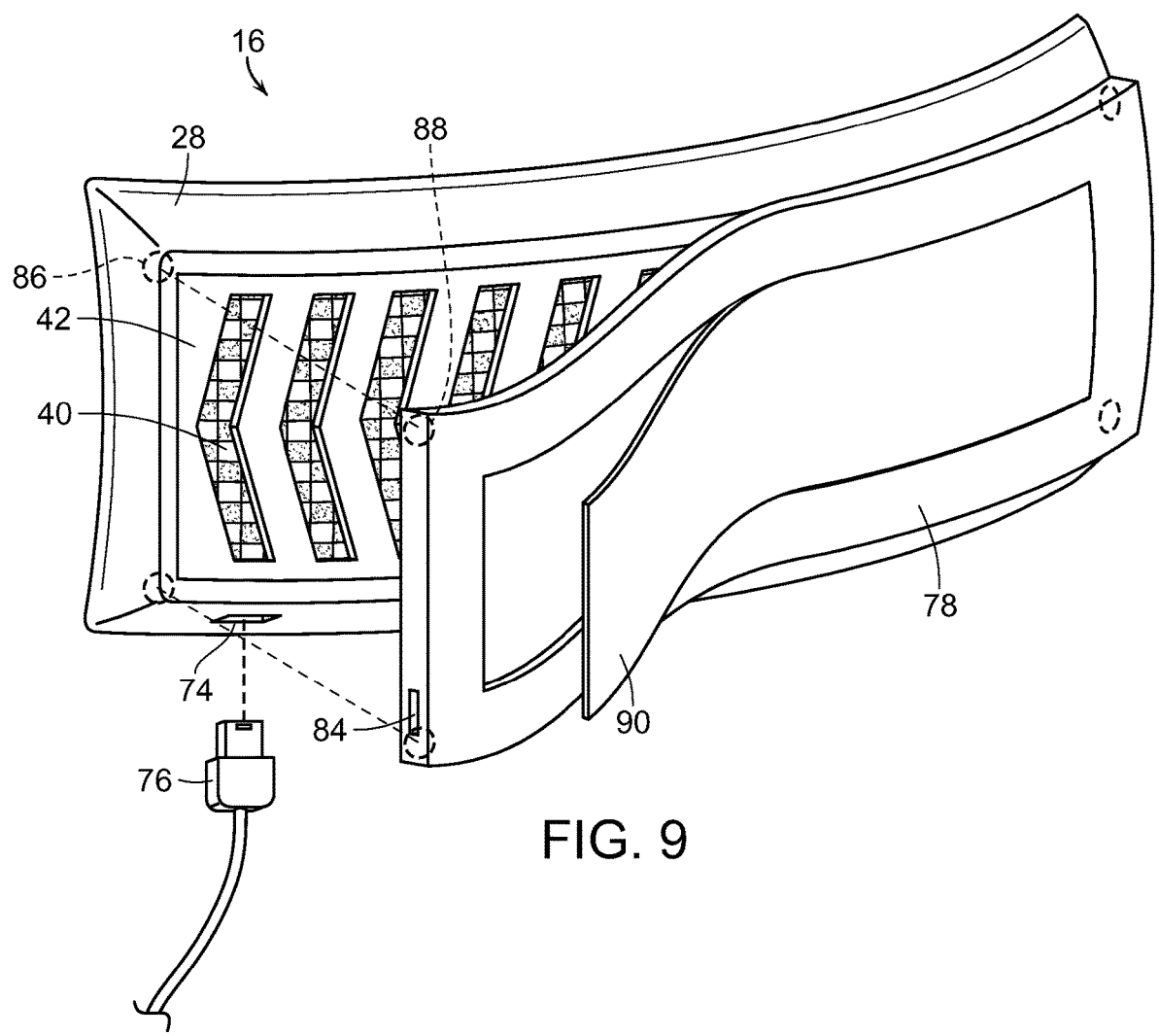
FIG. 9 is a front perspective view of the display having a charger operably attached thereto, in accordance with the present invention.

FIGS. 8 and 9 illustrate alternative ways of charging the rechargeable battery 34 of the illumination module 30. For example, as illustrated in FIG. 9, the display 16 may include a power port 74 for receiving a power cord 76 which is connected to any suitable power source. For example, the power cord 76 could comprise a USB cable coupled to a computer or to a recharging unit insertable into a wall power outlet. The rechargeable battery 34 could also be charged wirelessly, such as by placing the display 16, such as the helmet 12 to which the display 16 is attached, onto a wireless charging pad or the like, which could be placed, for example, on a table, counter or the like.

In a particularly preferred embodiment, however, a charger 78 is utilized which is removably attachable to the display 16 so as to overlay the display 16, as illustrated in FIGS. 8 and 9. Although the display 16 in FIG. 8 is illustrated as being separated from the helmet 12, it will be appreciated that typically the display 16 will be attached to the helmet, such as peeling off layer 80 to expose adhesive 82 to affix the display 16, particularly the back side of base housing 28 to the helmet 12. Thus, the display unit 16 is typically attached to the helmet 12 when the battery 34 is recharged. The charger 78 may include a power port 84 for interconnecting the charger 78 with the display 16, such as having power cord 76 interconnected between charging port 74 and 84. However, in a particularly preferred embodiment, the charger 78 wirelessly charges the rechargeable battery 34 by being overlaid and attached to a front surface of the display 16, so as to place it in sufficiently close contact so as to wirelessly charge battery 34 of the display 16. The removable connection may be made, for example, by magnets 86 and 88 associated, respectively, with the display 16 and the charger 78. Other attachment means are also contemplated by the present invention so as to removably attach the charger 78 to the display 16 so as to position the charger 78 on the display 16.

As illustrated in FIGS. 8 and 9, the charger 78 preferably is configured to substantially match that of the display 16, or at least an outer exposed surface of the display 16 so that the charger 78 overlies at least the exposed portion of the illumination module 30, and/or the applique 42. In one embodiment, the charger 78 includes at least a portion 90 that is transparent or translucent so as to permit light to be emitted therethrough. An applique 42 may be removably attachable to the outer surface of the charger 78 so as to define the logo and/or indicia of the applique, or the transparent or translucent portion 90 of the charger 78 may be formed so as to define a logo and/or indicia which is illuminated as the charger 78 recharges the battery 34 of the display 16. In this manner, the charger 78 may be utilized simultaneously with the display 16 and recharge the battery 34 of the display 16 while in use while riding the motorcycle if the light emitting portion 90 of the charger 78 allows light therethrough from the illumination module 40 of the display 16. However, in other instances, the charger 78 may merely be used when the display 16 is not in use when riding the motorcycle, and instead the logo or indicia illuminated by the light emitting portion 90 thereof is used merely for decorative purposes. It is contemplated that the charging unit 78 have its own interchangeable applique decals which can be removably attached to the light emitting portion 90 of the charging unit 78 so that a variety of indicia and/or logos and the like can be displayed and viewed when the charger 78 is in use.

It is also contemplated by the present invention to have an additional warning system. A transmitting beacon would be associated with the motorcycle and transmit a wireless signal. The range of the wireless signal could be controlled, such as up to one hundred meters, for example. Vehicles could be retrofitted or newer vehicles have installed, a signal receiver system wherein when the car is going to turn lanes and/or turn in an intersection, particularly when turning left, that the wireless signal transmitted from the motorcycle is received and a warning is issued to the driver of the vehicle to alert the driver that a motorcycle is in the close vicinity of the vehicle. This may be done, for example, when actuating the left signal of the vehicle, which activates a receiver which checks to receive if a motorcycle wireless signal is transmitted in the area near the vehicle. If so, a warning, such as a flashing light and/or audible noise or the like can alert the driver so that the driver does not accidentally turn in front of or hit the motorcycle which may be in a lane adjacent to the vehicle or in oncoming traffic to an intersection where the vehicle is turning left. A large number of accidents occur when vehicles inadvertently turn into an oncoming motorcycle or motorcycle in an adjacent lane to the vehicle as the drivers either do not see or are not sufficiently attentive to motorcyclists either to the side of the vehicle or coming from opposing traffic. Such a warning system could prevent a large number of such accidents.

Although several embodiments have been described in detail for purposes of illustration, various modifications may be made without departing from the scope and spirit of the invention. Accordingly, the invention is not to be limited, except as by the appended claims.

What is claimed is:

1. A helmet lighting system, comprising:
    a wireless transmitter operably coupled to a brake or direction signal lights of a motorcycle for transmitting a wireless signal when the brake or direction signal is actuated;
    a display attachable to a helmet, comprising:
    a base housing attachable to an outer surface of the helmet, the base housing being flexible so as to conform to the outer surface of the helmet;
    a flexible illumination module at least partially disposed within the base housing, the illumination module comprising a power source, illuminating LEDs, a wireless signal receiver and electronic components for illuminating the LEDs in response to a transmitted wireless signal; and
    a flexible applique overlying the illumination module, the applique being at least partially transparent or translucent so as to pass light from the LEDs therethrough, the applique being removably attachable to the base housing and/or the illumination module; and
    a charger for charging a rechargeable battery of the illumination module, the charger being configured to be removably attachable to the display so as to overlay the display;
    wherein the illumination module emits a first light color through the applique during normal operation and emits another light color upon receipt of the wireless signal.

2. The system of claim 1, wherein a periphery of the illumination module is disposed within the base housing and the applique is removably adhered to an exposed portion of an outermost layer of the illumination module.

3. The system of claim 1, wherein the illumination module emits a white or blue light color during normal operation and a red light color when the brake of the motorcycle is actuated.

4. The system of claim 1, wherein the at least partially transparent or translucent portion of the applique defines a logo and/or word indicia viewable from behind the helmet.

5. The system of claim 4, including a second applique having a second logo and/or indicia, the second applique being removably attachable to the base housing and/or the illumination module in place of the applique.

6. The system of claim 1, wherein the charger wirelessly charges the rechargeable battery power source of the illumination module.

7. The system of claim 1, wherein the charger has an outer configuration substantially matching that of the display and includes at least a portion that is transparent or translucent defining a logo and/or indicia that is illuminated as the charger recharges the display.

\* \* \* \* \*